United States Patent
Moeyersons

(10) Patent No.: US 8,097,114 B2
(45) Date of Patent: Jan. 17, 2012

(54) GLASS LAMINATE CONTAINING IONOMER

(75) Inventor: Luc A. Moeyersons, Mechelen (BE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1112 days.

(21) Appl. No.: 11/856,531

(22) Filed: Sep. 17, 2007

(65) Prior Publication Data

US 2009/0071604 A1    Mar. 19, 2009

(51) Int. Cl.
*B29C 65/00*    (2006.01)

(52) U.S. Cl. ........ 156/285; 156/286; 156/311; 156/381; 156/382

(58) Field of Classification Search .................. None
See application file for complete search history.

(56) References Cited

U.S. PATENT DOCUMENTS

| | | | | |
|---|---|---|---|---|
| 3,234,062 A | * | 2/1966 | Morris | 156/104 |
| 3,282,722 A | * | 11/1966 | Hailstone | 428/409 |
| 5,147,485 A | | 9/1992 | Gajewski | |
| 5,536,347 A | * | 7/1996 | Moran | 156/103 |
| 5,698,053 A | | 12/1997 | Carroll | |
| 5,728,472 A | * | 3/1998 | D'Errico | 428/437 |
| 5,763,062 A | * | 6/1998 | Smith et al. | 428/215 |
| 2004/0221526 A1 | * | 11/2004 | Rinehart et al. | 52/204.62 |
| 2004/0234731 A1 | * | 11/2004 | Rinehart et al. | 428/192 |
| 2004/0238998 A1 | * | 12/2004 | Bordeaux | 264/234 |
| 2005/0089692 A1 | * | 4/2005 | Anderson | 428/426 |
| 2005/0233125 A1 | * | 10/2005 | Anderson et al. | 428/221 |
| 2005/0234185 A1 | * | 10/2005 | Smith et al. | 524/557 |
| 2005/0266187 A1 | * | 12/2005 | Smith et al. | 428/34 |
| 2006/0141212 A1 | * | 6/2006 | Smith et al. | 428/141 |
| 2006/0182983 A1 | * | 8/2006 | Paul et al. | 428/500 |

FOREIGN PATENT DOCUMENTS

| | | |
|---|---|---|
| CA | 2 388 107 | 5/2001 |
| WO | 91/01880 | 2/1991 |
| WO | WO 2004011538 A2 * | 2/2004 |
| WO | WO 2007029541 A1 * | 3/2007 |

OTHER PUBLICATIONS

F.J. Pern and G.J. Jorgensen; Enhanced Adhesion of EVA Laminates to Primed Glass Substrates Subjected to Damp Heat Exposure; Feb. 2005; Nation Renewable Energy Laboratory; p. 1.*

* cited by examiner

*Primary Examiner* — Robert J Hill, Jr.
*Assistant Examiner* — Ninh Le
(74) *Attorney, Agent, or Firm* — Lucas K. Shay

(57) ABSTRACT

A non-autoclave process for producing a glass laminate comprises applying a sub-assembly including a rigid layer and an ionomer interlayer in a vacuum bag or vacuum press under vacuum followed by heating, cooling, and releasing vacuum.

10 Claims, 1 Drawing Sheet

GLASS LAMINATE CONTAINING IONOMER

This invention relates to laminated safety glass comprising ionomeric materials as an interlayer.

BACKGROUND OF THE INVENTION

Several patents and publications have been cited in this description in order to more fully illustrate the state of the art technology utilized which is highly relevant to this invention. The entire disclosure of each of these patents and publications is incorporated by reference herein.

Laminated glass is utilized in a broad spectrum of products including safety glass found in automobile windshields, windows in trains, airplanes, ships, and can be found in some form in virtually all transportation machinery. Safety glass is characterized by high impact and penetration resistance and does not scatter glass shards and debris when shattered.

Laminated glass typically consists of a sandwich of two glass sheets or panels bonded together with an interlayer of a polymeric film or sheet, which is placed between the two glass sheets. One or both of the glass sheets may be replaced with optically clear rigid polymeric sheets, such as sheets of polycarbonate materials. Laminated articles have further evolved to include multiple layers of glass and polymeric sheets bonded together with interlayers of polymeric films or sheets.

The interlayer utilized, is typically a relatively thick polymer sheet which is well known for it's durability, as well as its to bond effectively to glass, thus creating a far safer product in the event of a crack or crash. In general, it is desirable that these polymeric interlayers possess a combination of characteristics including very high optical clarity, low haze, high impact resistance, high penetration resistance, excellent ultraviolet light resistance, good long term thermal stability, excellent adhesion to glass and other rigid polymeric sheets, low ultraviolet light transmittance, low moisture absorption, high moisture resistance, and excellent long term weatherability, among other requirements.

Laminated articles are most commonly formed by subjecting the assembly to elevated temperatures and pressures in an autoclave to bond the components.

Non-autoclave processes are generally considered to be less robust, and have a greater yield loss associated with adhesion and lamination failures in the finished article. Fabricators must exercise greater care at process control parameters to achieve the desired adhesion levels and clarity for the finished article. Trapped voids of air and moisture between the layers of the laminate are most often to blame for the defects in the finished laminate. However, even with the most stringent attention to details, lamination integrity failures and cosmetic defects (edge bubbles) may still occur with regularity and without sufficient understanding of the cause. Many different attempts have been made to improve the reliability of the non-autoclave processes utilized in producing these laminates, but heretofore, none have proven satisfactory. See, e.g., U.S. Pat. Nos. 3,234,062, 3,852,136, 4,341,576, 4,385,951, 4,398,979, and 5,536,347 and EP patent 1235683B1. See also U.S. Pat. No. 6,342,116 (a multi-stage process for laminating multi-layer pre-forms into laminated glazing assemblies where the pre-forms are heated to an assembly or bonding temperature in a heating chamber, while still being subjected to vacuum).

SUMMARY OF THE INVENTION

A process that can be used, for example, for preparing a rigid laminate containing an ionomeric interlayer without use of an autoclave comprising sequentially: providing a rigid layer and ionomeric interlayer; constructing a sub-assembly comprising the rigid layer and ionomeric interlayer; placing the sub-assembly in a vacuum bag or vacuum press; applying a vacuum to the vacuum bag or vacuum press for a maximum of 30 to 60 minutes while maintaining the sub-assembly at a temperature between 10° C. and 22° C., and under a vacuum pressure of 40 kPa or less, to produce a cooled sub-assembly; increasing the temperature of the cooled sub-assembly to at least 100° C. or 135° C. over a minimum of 10 minutes or 20 minutes to produce a heated sub-assembly; maintaining the heated sub-assembly at minimum of 100° C. or 135° C. for a minimum of 10 minutes or 20 minutes to form a laminate; cooling the laminate at a rate of at least 0.5° C./minute until the laminate reaches a temperature below 40° C.; removing the vacuum pressure applied from the vacuum bag, containing the laminate, and allowing the laminate to reach atmospheric pressure as the laminate continues to cool to ambient temperature. The materials and assembly of the sub-assembly prior to the lamination process are in an environment cooled between 10° C. and 22° C. and less than 40 percent relative humidity and the process of assembly of the sub-assembly through cooling the laminate at a rate of at least 0.5° C./minute until the laminate reaches a temperature below 40° C.

DETAILED DESCRIPTION

Figure 1:
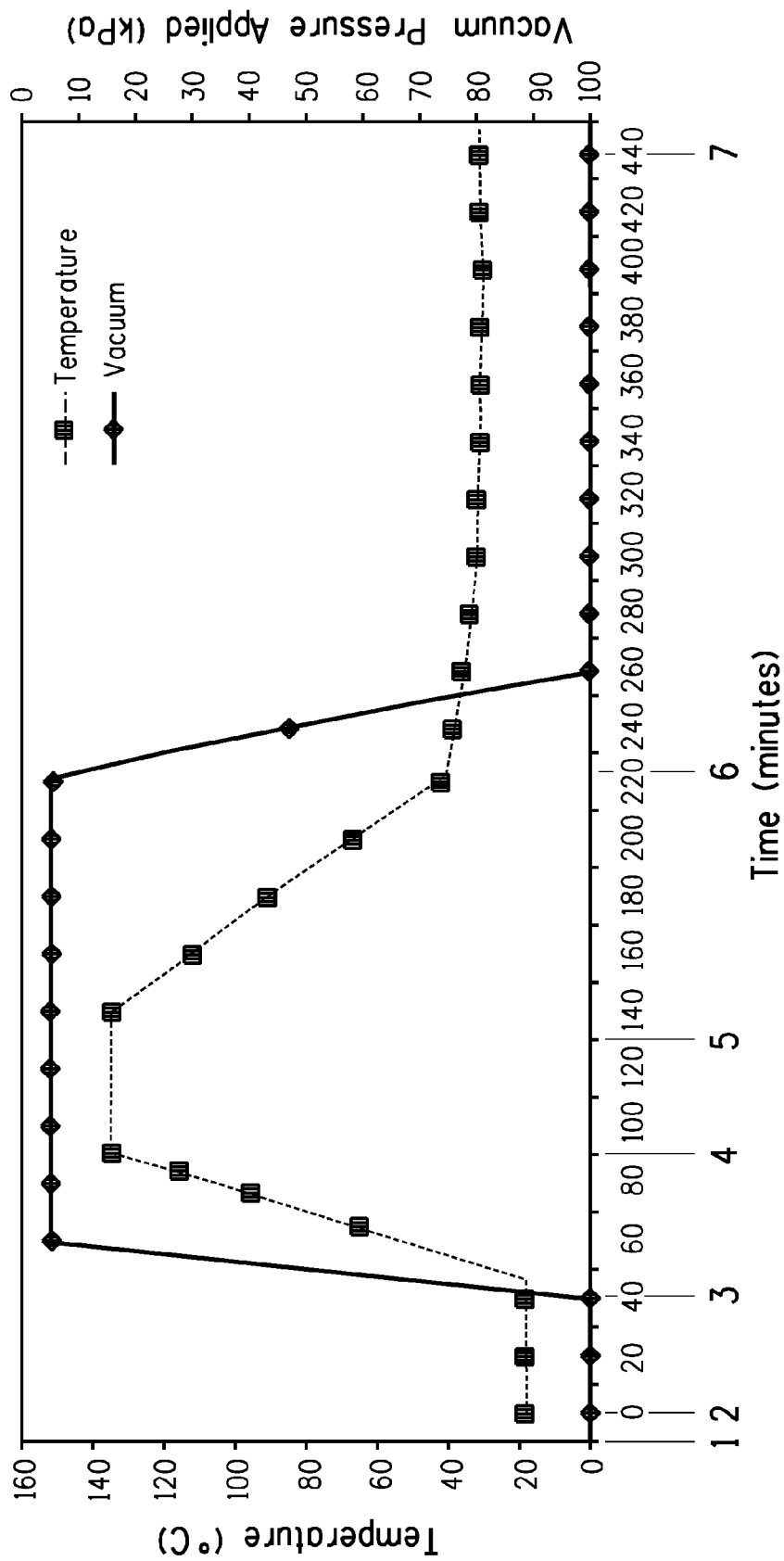
FIG. 1 is a time/temperature/pressure cycle plot of representative process conditions used in an illustrative laminate article made with an ionomeric interlayer.

All publications, patent applications, patents, and other references mentioned herein are incorporated by reference in their entirety.

Unless stated otherwise, all percentages, parts, ratios, etc., are by weight. Use of "a" or "an" to describe elements and components includes one or at least one and the singular also includes the plural unless it is obvious that it is meant otherwise.

The term "(meth)acrylic", as used herein, alone or in combined form, such as "(meth)acrylate", refers to acrylic and/or methacrylic, for example, acrylic acid and/or methacrylic acid, or alkyl acrylate and/or alkyl methacrylate.

This invention is directed to the improvements of a non-autoclave process for making glass laminated articles containing an ionomeric material as a polymeric interlayer. Ionomeric materials are well known and preferred material for making laminated safety glass that exhibit high strength properties.

The ionomeric polymeric sheets useful for the laminate interlayer comprise a polymer with a modulus between 20,000 psi (138 MPa) and 100,000 psi (690 MPa), preferably with a modulus between about 25,000 psi (173 MPa) and about 90,000 psi (621 MPa), and more preferably with a modulus between about 30,000 psi (207 MPa) and about 80,000 psi (552 MPa), as measured by ASTM Method D-638.

The polymeric sheets used in the high strength multilayer laminates preferably comprise ethylene copolymers that incorporate acid functionality. The ethylene copolymers incorporate from between about 0.1 weight percent to about 30 weight percent acrylic acids, preferably from about 10 weight percent to about 25 weight percent acrylic acids, and more preferably from about 15 weight percent to about 25 weight percent acrylic acids, based on the total weight of the polymer. Acrylic acids include, but are not limited to, acrylic acid, methacrylic acid, itaconic acid, maleic acid, maleic anhydride, fumaric acid, monomethyl maleic acid, and mixtures thereof and most preferably are selected from the group consisting of acrylic acid, methacrylic acid, and mixtures thereof.

Ethylene copolymers used in the polymeric sheets may optionally further comprise other unsaturated comonomers such as acrylates and methacrylates. The other unsaturated comonomers may be selected from the group consisting of methyl acrylate, methyl methacrylate, butyl acrylate, butyl methacrylate, glycidyl methacrylate, vinyl acetate, and mixtures thereof. The ethylene copolymers used in the polymeric sheets may comprise between 0 and about 50 weight percent of the other unsaturated comonomer, based on the total weight of the ethylene copolymer composition. The ethylene copolymers may preferably incorporate between 0 and about 25 weight percent of the other unsaturated comonomer and may most preferably incorporate between 0 weight percent and about 10 weight percent of the other unsaturated comonomer.

The ethylene copolymers can be neutralized from 0 to about 100 percent with metallic ions based on the total carboxylic acid content. The ethylene copolymers maybe neutralized from about 10 to about 90 percent, more preferably maybe neutralized about 20 to about 80 percent. The metallic ions used may be monovalent, divalent, trivalent, multivalent, or mixtures thereof such as sodium, potassium, lithium, silver, mercury, zinc, copper, or mixtures of two or more thereof. Examples of such polymer include Surlyn® available from DuPont.

Suitable polymeric sheets are available commercially. Ionomeric sheet is commercially available from DuPont as Sentryglas® Plus sheeting.

The polymeric sheets may further comprise additives, such as thermal stabilizers, ultraviolet (UV) absorbers, UV stabilizers, plasticizers, organic peroxides, adhesion promoters and mixtures or combinations thereof.

The polymeric interlayer has a thickness of about 10 mils (0.25 mm), or greater. The polymeric sheet may have a thickness of about 15 mils (0.38 mm), or greater, based on enhanced penetration strength of the laminates produced therefrom. More preferably, the polymeric sheet may have a thickness of about 30 mils (0.75 mm), or greater, based on further enhanced penetration strength of the laminates produced therefrom. Even more preferably, the polymeric sheet may have a thickness of about 50 mils (1.25 mm), or greater, based on even further enhanced penetration strength of the laminates produced therefrom. The enhanced penetration strength is necessary to satisfy many of the current mandated requirements for hurricane and threat resistance. Many end-uses in the current environment require the ethylene copolymer interlayer to be even thicker. Interlayers thicker than 60 mils (1.50 mm), 90 mils (2.25 mm), and even thicker than 120 mils (3.00 mm), are becoming common in the marketplace.

Suitable polymeric sheets may be formed by any suitable process, such as extrusion, calendering, solution casting or injection molding. The polymer sheet can be formed by extrusion.

The polymeric film useful in the multilayer laminate articles may be formed from any polymeric matrix material. For example, the polymeric film is a biaxially oriented poly(ethylene terephthalate) film, a cellulose acetate film or a polycarbonate film.

Preferably, one or both surfaces of the polymeric film may be treated to enhance the adhesion to the coating or to the polymeric sheet or both. This treatment may take any form known within the art, including adhesives, primers, such as silanes, flame treatments, plasma treatments, electron beam treatments, oxidation treatments, corona discharge treatments, chemical treatments, chromic acid treatments, hot air treatments, ozone treatments, ultraviolet light treatments, sand blast treatments, solvent treatments, and the like and combinations thereof.

The difference between a polymeric film and a polymeric sheet is the thickness, but there is no set industry standard as to when a film becomes a sheet. A film has a thickness of about 10 mils (0.25 mm) or less, between about 0.5 mils (0.012 millimeters (mm)), to about 10 mils (0.25 mm), or about 1 mil (0.025 mm) to about 5 mils (0.13 mm).

For manufacturing large quantities of sheets, a sheeting calender is employed. The rough film is fed into the gap of the calender, a machine comprising a number of heatable parallel cylindrical rollers which rotate in opposite directions and spread out the polymer and stretch it to the required thickness. The last roller smoothes the sheet thus produced. If the sheet is required to have a textured surface, the final roller is provided with an appropriate embossing pattern. Alternatively, the sheet may be reheated and then passed through an embossing calender. The calender is followed by one or more cooling drums. Finally, the finished sheet is reeled up or cut into lengths and stacked.

The polymeric sheet may have a smooth surface. Preferably, the polymeric sheet to be used as an interlayer within laminates may have a roughened surface to effectively allow most of the air to be removed from between the surfaces of the laminate during the lamination process. This may be accomplished, for example, by mechanically embossing the sheet after extrusion, as described above, or by melt fracture during extrusion of the sheet and the like. For example, the as extruded sheet may be passed over a specially prepared surface of a die roll positioned in close proximity to the exit of the die which imparts the desired surface characteristics to one side of the molten polymer. Thus, when the surface of such roll has minute peaks and valleys, sheet formed of polymer cast thereon may have a rough surface on the side which contacts the roll which generally conforms respectively to the valleys and peaks of the roll surface. This rough surface is only temporary and particularly functions to facilitate deairing during laminating after which it is melted smooth from the elevated temperature from the non-autoclave processes. Biaxially stretched polymeric sheets are preferred.

Adhesives and primers may be used to enhance the bond strength between the laminate layers, if desired, as is generally known in the art. For example, silane coupling agents may be applied to the films and sheets to enhance the adhesion between layers. Specific examples of useful silane coupling agents are gammaglycidoxypropyltrimethoxysilane or gamma-aminopropyltriethoxysilane. Typically, said silane coupling agents are added at a level of about 0.01 to about 5 weight percent based on the total weight of the film or sheet composition. An example of a preferred primer is polyallyl amine. Examples of adhesives are epoxy and siloxane resins. Other additives, including but not limited to antioxidants, ultraviolet absorbers, ultraviolet stabilizers, thermal stabilizers, and colorants, may also be added to ionomeric composition. See, e.g., U.S. Pat. No. 5,190,826.

The extruded sheet may be passed over a specially prepared surface of a die roll positioned in close proximity to the exit of the die which imparts the desired surface characteristics to one side of the molten polymer. Thus, when the surface of such a roll has minute peaks and valleys, sheet formed of polymer cast thereon may have a rough surface on the side which contacts the roll which generally conforms respectively to the valleys and peaks of the roll surface. Such die rolls are disclosed in, for example, U.S. Pat. No. 4,035,549. As is known, this rough surface is only temporary and particularly functions to facilitate de-airing during laminating after which it is melted smooth from the elevated temperature and pressure associated with autoclaving and other lamination processes.

The polymeric sheets may further comprise additives such as plasticizers, processing aides, flow enhancing additives, lubricants, pigments, dyes, flame retardants, impact modifiers, nucleating agents to increase crystallinity, antiblocking agents such as silica, thermal stabilizers such as, but not limited to those disclosed in U.S. Pat. Nos. 4,325,863, 4,338,244, 5,175,312, 5,216,052, 5,252,643, 5,356,966, 5,367,008, 5,369,159, 5,428,162, 5,428,177, 5,488,117, 5,516,920, 5,607,624, 5,614,572, 5,693,829, 5,773,631, 5,814,692, 6,140,397, 6,521,681, and 6,586,606. See also, DE-A-4316611, DE-A-4316622, DE-A-4316876, EP-A-0589839, and EP-A-0591102, UV absorbers, UV stabilizers, dispersants, surfactants, chelating agents, coupling agents, adhesives, primers and the like.

The rigid sheets useful in the laminates may be glass or rigid transparent plastic sheets, such as, for example, polycarbonates, acrylics, polyacrylates, cyclic polyolefins, such as ethylene norbornene polymers, metallocene-catalyzed polystyrenes and the like and combinations thereof. Metal or ceramic plates may also be suitable, if transparency is not required for the laminate.

The term "glass" is meant to include not only window glass, plate glass, silicate glass, sheet glass, and float glass, but also includes colored glass, specialty glass which includes ingredients to control, for example, solar heating, coated glass with, for example, sputtered metals, such as silver or indium tin oxide, for solar control purposes and other specialty glasses. The type of glass to be selected for a particular laminate depends on the intended use. A typical glass is 90 mil thick annealed flat glass.

This invention provides process improvements enhancing the sub-assembly capability of subsequent deairing and devolatization steps of the non-autoclave process. In the known non-autoclave process, the polymeric interlayer sheet generally has a moisture content of about 0.2 wt. %, and typical commercial autoclave grades are about 0.3 to 0.6 wt. %, prior to being plied into the laminated article sub-assembly. With the known non-autoclave process, it is desirable to take additional precautions to store the polymeric sheet in cool and low moisture conditions prior to consumption in the lamination process. A manufacturer of laminates may store the polymeric interlayer between at about 6° C. and 20° C., and 20 and 40 percent relative humidity for at least 24 hours prior to use. The manufacturer of laminates may then take the polymeric sheet out of the controlled storage conditions and ply up the laminated assembly in ambient temperature and humidity conditions.

FIG. 1 is plot of both temperature and vacuum pressure against a time scale as the components proceed through the process to form a laminate in the non-autoclave process. The temperatures shown in FIG. 1 are understood to be the temperature of component layers that ultimately are formed into the laminate article, and not the necessarily the environment around the component layers.

This invention provides a more optimal lamination by conditions for storing the ionomeric interlayer and rigid glass layers prior to assembling into the sub-assembly, as well as assembling the sub-assembly in controlled temperature conditions.

All layers of the laminated article, including the polymeric interlayer and the rigid glass sheets, are conditioned and allowed to equilibrate at about 10° C. to about 23° C. as well as less than about 40 percent relative humidity prior to assembly into the sub-assembly (FIG. 1, 1). All layers of the laminated article may be conditioned and allowed to equilibrate at about 10° C. and less than 18° C. as well as less than 40 percent relative humidity prior to assembly. Any technique may be used to achieve these temperature conditions, but most commonly the temperature may be controlled by air conditioning.

Typically, the ionomeric interlayer sheet is positioned between two rigid layers, such as two glass plates, to form a glass/interlayer/glass sandwich assembly. The laminated article at this stage is referred to as a sub-assembly (FIGS. 1, 2). Once all layers of materials have reached the proper temperature, the sub-assembly may be constructed as a sandwich structure. All surfaces of the glass layer may be clean and dried prior to use in making the sub-assembly. The component layers (glass layer/interlayer/second glass layer) may be applied sequential in layers to make the sub-assembly at about 10° C. and less than 23° C. as well as less than 40 percent relative humidity. The sub-assembly may be constructed at about 10° C. and less than 18° C. as well as less than 40 percent relative humidity.

Once assembled in the controlled temperature and humidity conditions, the sub-assembly may be stored at these conditions prior to lamination or may immediately be processed. Any technique may be used to achieve these temperature and humidity conditions, but most commonly the temperature may be controlled by air conditioning. If the environment is typically greater than 40 percent relative humidity, dehumidifying equipment or sieve air dryers for a storage air may be useful.

In a typical lamination process, a glass sheet, an interlayer composed of a polymeric sheet, and a second glass sheet are laminated together under heat and the assembly held under a vacuum (for example, in the range of about 90 kPa to 100 kPa), to remove air or de-airing of the laminating sub-assembly. The sub-assembly is placed into a bag capable of sustaining a vacuum ("a vacuum bag"). The air is drawn out of the vacuum bag using a vacuum line or other means of pulling a vacuum on the vacuum bag. The vacuum bag is sealed while maintaining the vacuum. The de-airing of the sub-assembly can be improved if the vacuum pressure is applied to a chilled sub-assembly structure (FIGS. 1, 2). One embodiment is applying the vacuum to the sub-assembly while the temperature of the sub-assembly is kept at about 10° C. and less than about 23° C. Preferred is applying the vacuum pressure to the sub-assembly while the temperature of the sub-assembly is kept at about 10° C. and less than about 18° C. Any technique may be used to achieve these temperature conditions, but most commonly the temperature may be controlled by air conditioning. As practical, maximum vacuum pressure may be applied to maximize air removal since superatmospheric pressure (from the autoclave) is unavailable to assist in dissolving residual air in the sheet during bonding to the glass. The assembly is subject to this vacuum without heating over a brief period during which the rough surface on the PVB sheet is intact to facilitate air removal. This period varies with the design of the system used and is typically about 10 to about 30 minutes. The absence of heat during this phase avoids premature sealing of the sheet to the glass during air removal.

Without being held to theory, the chilling of all layers as well as fabricating the sub-assembly in controlled temperature and humidity conditions help ensure that the surface roughness of the polymeric sheet retain a higher modulus longer, and allow a more uniform and overall greater degree of evacuation of any air that might be trapped between the layers of the sub-assembly. This is essential to the improving the uniformity of the laminate properties produced by the non-autoclave lamination process.

Commercial polymeric interlayer sheets will have geometrically regular or irregular (random) patterns on its surfaces to help facilitate deairing. The surface patterns provide grooves or channels on both surface faces, which are defined by minute collapsible projections. During deairing, air at the interface with a glass layer is conventionally channeled through these grooves out through the periphery of the assembly. The projections are an integral part of the interlayer sheet which melt and collapse during heating after air removal. Once the sub-assembly is properly deaired, the polymeric interlayer may provide a clear, smooth, void-free surface which can be bonded to the abutting transparent glass layer.

After fabricating the sub-assembly, at least the edges are enclosed in a sealed space. One way to accomplish this is to insert the sub-assembly in a flexible rubber or nylon bag having a port communicating with a vacuum source (FIGS. 1, 3). Alternatively, a ring in communication with a vacuum source seals around the edges only of the assembly. When using a vacuum bag, a breather layer is used between the flexible bag and the laminate assembly enclosed therein. Such breather layer resists the flexible bag being prematurely tightly drawn down around the edges of the enclosed assembly when vacuum is imposed on the interior of the bag before all air from inside is evacuated.

The sub-assembly may be placed in either the vacuum bag or the vacuum ring may be applied to the sub-assembly and evacuated at about 10° C. and about less than 23° C. The sub-assembly may be placed in either the vacuum bag or the vacuum ring may be applied to the sub-assembly and evacuated at about 10° C. and about 18° C. ambient conditions. After enclosing the edges in a sealed space, vacuum is drawn on the sealed space to remove air therefrom and evacuate moisture and air from the sub-assembly.

After such period, the laminate assembly while maintaining vacuum is gradually heated to a temperature sufficient to seal the edges of the glass layers to the encapsulated ionomeric interlayer (FIGS. 1, 4). Any means may be used to efficiently heat the laminate subassembly while under vacuum. Conventional ovens with variety of heating sources, such as gas-fired or electrical resistivity may be used; or continuous oven with infra-red sources, may be utilized as long as the vacuum may be adequately maintained about sub-assembly. The onset of the sealing may occur with the ionomer interlayer at as low as 27° C., but in order to achieve uniform sealing around the complete sub-assembly, the temperature may reach about 95° C. and happens about 20 minutes into the heating cycle in the embodiment encompassed by the plot displayed in FIG. 1. Then the temperature of the assembly is further increased to about 125° C. to about 135° C. while maintaining the vacuum on the process. This increase in temperature may be desirable to obtain mature edge seal for a minimum of 20 minutes, and assure that all layers of the sub-assembly have sufficiently adhered together (FIGS. 1, 5).

Controlled cooling and release of the vacuum may be desired to prevent the formation of edge bubbles of the laminate as well as optical transparency in the ionomer laminate. The temperature of the process is gradually lowered at a rate of about 0.5° C./minute to about 5° C./minute. It is desirable to continue to maintain the vacuum until the laminate article cools to about 40° C. (FIGS. 1, 6). Rapid cooling of the laminate structure prevents finely dispersed crystallites from being formed and thereby, creating a hazy interlayer. Rapid quenching of the thick layers can help the laminate have the desired transparency of the glass laminate. Alternately, the vacuum may also be gradually reduced over about 10 minutes up to the time necessary for the laminate article to reach 40° C. If the vacuum is released prematurely or too quickly, edge bubbles may form in the laminate article. Conditions for the cooling and vacuum removal may vary with the complexity of the laminated structure and the means used to heat and cool the process. Maintaining the vacuum until the laminate cools to 40° C. is preferred to promote good optical qualities and bubble free edges. The laminate can then be removed from the vacuum bag or ring after further cooling to ambient temperature (FIGS. 1, 7).

The various temperatures and periods of exposure described above are most conveniently provided by apparatus which includes a programmable oven or a conveyor for the subassembly to sequentially pass through zones maintained at the desired temperatures, but at such a rate that the heating of the laminate article is most economically achieved. In addition, the vacuum and temperature profile of the process may vary from that shown in FIG. 1 depending, for example, on the capacity and layout of the process equipment.

The laminate articles may include additional layers, such as other polymeric sheets, other coated or uncoated polymeric films.

EXAMPLES

Certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. Further, reference to values stated in ranges includes each and every value within that range.

Sixty sheets of 0.38 mm thick of SENTRYGLAS® B200 and 120 panes of float glass (4×2250×3210 mm) were cooled to 18° C. and stored at 40 percent relative humidity prior to assembling into thirty glass/interlayer/glass sub-assemblies. SENTRYGLAS® B2000 interlayer sheet as shipped, has a moisture content of 0.8 percent. Each sheet of poly vinyl butyral interlayer was interposed between two glass sheets to form a sub-assembly at 15.5° C. in a 40 percent relative humidity environment. The excess interlayer sheet overhanging the edges of the glass sheets were trimmed off. Each sub-assembly had a vacuum deairing ring applied around its peripheral edges and the de-airing ring was connected to a vacuum source. The vacuum source applied 95 kPa to the sub-assembly while it was maintained at 15.5° C. for 30 minutes.

While still under the vacuum, all sub-assemblies and deairing rings were loaded vertically (with the short edge on the bottom) into three carts, so as to position approximately 50 mm between each sub-assembly. The spacing of the laminates desirably allows for hot air to flow thoroughly around each sub-assembly while in the oven. The carts were positioned into a 2500 mm wide, 3500 mm high and 3500 mm deep electrical circulating air convention oven, which was heated to 135° C. The surface temperature of the sub-assemblies was monitored by an infrared thermometer during the heating stage to verify that the sub-assemblies were reaching the proper temperature. Each sub-assembly remained under vacuum while in the oven. Based upon the air flows of the oven, the sub-assembly reached the targeted 135° C. temperature over a 50 minute time period. Vacuum was continued to be applied while the sub-assemblies were held in the oven for an additional 40 minutes to ensure that the glass, interlayer, and glass firmly adhered to each other.

At the conclusion of the heating cycle, the vacuum pump and oven heating were turned off. However, the vacuum remained at approximately the same levels on the laminated structure because of the integrity of the vacuum system did not appreciably bleed down the vacuum. The carts containing the 60 laminate articles remained in the oven overnight to cool. The de-airing vacuum ring was disconnected from the vacuum source, once the laminate structure was verified to be below 40° C. Once the laminate was cool to touch, the laminated structure was removed from the de-airing ring.

All sixty laminated structures were visually inspected. Each laminate was found to have high optical clarity, indicating that the process had been effective at removing the air and moisture from between the layers and that the layers had adhered securely to each other. In addition, all sixty of the laminate structures where found to be clear visual clarity and free of edge bubbles.

The invention claimed is:

1. A process comprising sequentially:
   (a) providing two rigid layers and an ionomeric interlayer,
   (b) constructing a sub-assembly comprising the ionomeric interlayer between the rigid layers;
   (c) placing the sub-assembly in a vacuum bag or vacuum press;
   (d) applying a vacuum to the vacuum bag or vacuum press for a maximum of 30 minutes while maintaining the sub-assembly at a temperature between 10° C. and 22° C.;
   (e) increasing the temperature of the sub-assembly to at least 125° C. over a minimum of 20 minutes while maintaining vacuum on the vacuum bag or vacuum press;
   (f) processing the sub-assembly between 125° C. and 135° C. for a minimum of 20 minutes to form a laminate having mature edge seal and to effect sufficient adhesion of all layers of the sub-assembly;
   (g) cooling the laminate at a rate of at least 0.5° C./minute until the laminate reaches a temperature below 40° C. to prevent the formation of edge bubbles of the laminate; and
   (h) removing the vacuum from the vacuum bag, containing the laminate, and allowing the laminate to reach atmospheric pressure as the laminate continues to cool to ambient temperature; wherein step (a) through step (d) are carried out at 10° C. to 22° C. and a relative humidity of greater than 0 percent but less than 40 percent; and step (d) through step (g) are carried out under a vacuum pressure of 40 kPa or less.

2. The process of claim 1 wherein the rigid layer is a glass sheet.

3. The process of claim 1 wherein step (a) to step (d) are carried out at 10° C. to 18° C.

4. The process of claim 1 wherein step (d) is carried out for 10 minutes.

5. The process of claim 1 wherein the temperature in step (e) is increased to at least at 130° C. and step (f) is carried out at least at 130° C.

6. The process of claim 1 wherein the temperature in step (e) is increased to at least at 130° C. and step (f) is carried out at least at 135° C.

7. The process of claim 1 wherein the rate in step (g) is at least 3° C./minute.

8. The process of claim 1 wherein the rate in step (g) is at least 5° C./minute.

9. A process comprising sequentially:
   (a) providing two rigid layers and an ionomeric interlayer,
   (b) constructing a sub-assembly comprising the ionomeric interlayer between the rigid layers:
   (c) placing the sub-assembly in a vacuum bag or vacuum press;
   (d) applying a vacuum to the vacuum bag or vacuum press for a maximum of 30 minutes while maintaining the sub-assembly at a temperature between 10° C. and 22° C.;
   (e) increasing the temperature of the sub-assembly to at least 125° C. over a minimum of 20 minutes while maintaining vacuum on the vacuum bag or vacuum press;
   (f) processing the sub-assembly at a minimum of 125° C. for a minimum of 20 minutes to form a laminate;
   (g) cooling the laminate at a rate of at least 10° C./minute until the laminate reaches a temperature below 40° C.; and
   (h) removing the vacuum from the vacuum bag, containing the laminate, and allowing the laminate to reach atmospheric pressure as the laminate continues to cool to ambient temperature;
   wherein step (a) through step (d) are carried out at 10° C. to 22° C. and a relative humidity of greater than 0 percent but less than 40 percent; and step (d) through step (g) are carried out under a vacuum pressure of 40 kPa or less.

10. The process of claim 9 wherein, the interlayer is stored at between about 6° C. and 20° C. and 20 to 40 percent relative humidity for at least 24 hours.

* * * * *